(12) United States Patent
Li et al.

(10) Patent No.: US 8,520,483 B2
(45) Date of Patent: Aug. 27, 2013

(54) METHOD AND SYSTEM FOR PROCESSING INFORMATION FROM OPTICAL DISK LAYERS

(75) Inventors: Xiaohong Li, Clifton Park, NY (US); Xuefeng Wang, Niskayuna, NY (US); Zhiyuan Ren, Malta, NY (US); John Erik Hershey, Ballston Lake, NY (US); John Anderson Fergus Ross, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/846,085

(22) Filed: Jul. 29, 2010

(65) Prior Publication Data

US 2012/0026855 A1 Feb. 2, 2012

(51) Int. Cl.
*G11B 7/00* (2006.01)

(52) U.S. Cl.
USPC .......................................................... 369/103

(58) Field of Classification Search
USPC .......................................................... 396/103
See application file for complete search history.

(56) References Cited

U.S. PATENT DOCUMENTS

| | | | |
|---|---|---|---|
| 5,079,653 A | | 1/1992 | Gauthier et al. |
| 5,168,398 A * | | 12/1992 | Kanda et al. ............... 360/78.04 |
| 5,612,939 A * | | 3/1997 | Ueki et al. ................. 369/47.11 |
| 5,784,352 A | | 7/1998 | Swanson et al. |
| 6,322,933 B1 | | 11/2001 | Daiber et al. |
| 7,151,728 B2 | | 12/2006 | Shoji et al. |
| 7,414,955 B2 | | 8/2008 | Iwanaga |
| 7,596,463 B2 | | 9/2009 | Malki et al. |
| 2002/0118613 A1 * | | 8/2002 | Tada et al. .................. 369/44.27 |
| 2004/0125711 A1 * | | 7/2004 | Sato et al. ................... 369/44.32 |
| 2004/0264340 A1 * | | 12/2004 | Yamatsu ....................... 369/103 |

(Continued)

FOREIGN PATENT DOCUMENTS

| | | |
|---|---|---|
| EP | 0486060 A2 | 5/1992 |
| EP | 2141531 A1 | 1/2010 |

(Continued)

OTHER PUBLICATIONS

Robert R. McLeod, Andrew J. Daiber, Mark E. McDonald, Timothy L. Robertson, Timothy Slagle, Sergei L. Sochava, and Lambertus Hesselink; Microholographic multilayer optical disk data storage; OpticsInfoBase;(2005) vol. 44, Issue 16, pp. 3197-3207.

(Continued)

*Primary Examiner* — Aneeta Yodichkas
(74) *Attorney, Agent, or Firm* — Joseph J. Christian

(57) ABSTRACT

A method for processing information is provided. The method includes directing a laser beam to a first track of a first layer of a holographic storage medium. The method also includes recording a base voltage based on a look-up table. The method includes directing the laser beam to a target track in the first layer, based on position information in tracks. Further, the method includes recording an offset voltage for the target track into the look-up table. Still further, the method includes directing the laser beam to a target layer based on position information in vertical wobbles. The method also includes recording an offset voltage for the target layer into the look-up table. Finally, the method includes determining a final voltage based on the look-up table and applying the final voltage to an actuator for moving the laser beam to a final target position in the holographic storage medium for recording and retrieval of information.

8 Claims, 6 Drawing Sheets

(56) References Cited

U.S. PATENT DOCUMENTS

| | | |
|---|---|---|
| 2006/0114774 A1* | 6/2006 | Kun-yi ............... 369/44.32 |
| 2006/0114792 A1* | 6/2006 | Uno et al. ............ 369/103 |
| 2006/0133249 A1 | 6/2006 | Kogure |
| 2006/0171006 A1 | 8/2006 | Fukumoto et al. |
| 2007/0076543 A1* | 4/2007 | Tazaki ............... 369/44.25 |
| 2007/0171781 A1* | 7/2007 | Imai et al. ............ 369/44.27 |
| 2008/0239922 A1 | 10/2008 | Fujita et al. |
| 2009/0003153 A1 | 1/2009 | Yamatsu |
| 2009/0086595 A1 | 4/2009 | Takahashi et al. |
| 2009/0086606 A1 | 4/2009 | Nishimura |
| 2009/0103415 A1* | 4/2009 | Usami ............... 369/103 |
| 2009/0175138 A1* | 7/2009 | Kim et al. ............ 369/44.11 |
| 2010/0027403 A1 | 2/2010 | Fujita et al. |
| 2010/0061210 A1 | 3/2010 | Kim et al. |

FOREIGN PATENT DOCUMENTS

| | | |
|---|---|---|
| EP | 2202734 A1 | 6/2010 |
| JP | 2008097753 A | 4/2008 |
| WO | 2008117228 A1 | 10/2008 |
| WO | 2009075424 A1 | 6/2009 |

OTHER PUBLICATIONS

Search Report and Written Opinion from corresponding EP Application No. 11174099.9-2210 dated Nov. 7, 2011.
Search Report and Written Opinion from corresponding EP Application No. 11174099.9-2210 dated Jul. 31, 2012.

* cited by examiner

METHOD AND SYSTEM FOR PROCESSING INFORMATION FROM OPTICAL DISK LAYERS

BACKGROUND

The invention relates generally to a processing of information from an optical disk layer, and more particularly to a method and system for processing information from optical layers of a holographic data storage medium.

Generally, holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam, which contains digitally encoded data, is superposed on a reference beam within the volume of the storage medium. This results in a chemical reaction thereby, changing or modulating the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disk formats, holographic disks may have multiple layers of data storage, providing data storage capacities that may be measured in terabytes (TB). Thus, the holographic storage medium stores information throughout the volume of the storage medium in multiple layers from about 50 to 100 layers. In order to read or record data in such multiple layers, the holographic storage medium must be complemented with a system and a method for focusing the objective lens of a pick-up head to an optimal depth of the layer on which the symbols of the selected layer are recorded.

Therefore, there is a need for a method and system for efficient processing of information from a multilayer holographic data storage medium.

BRIEF DESCRIPTION

In accordance with an embodiment of the invention, a method for processing information is provided. The method includes directing a laser beam to a first track of a first layer of a holographic storage medium. The method also includes recording a base voltage based on a look-up table. The method includes directing the laser beam to a target track in the first layer based on position information in tracks. Further, the method includes recording an offset voltage for the target track into the look-up table. Still further, the method includes directing the laser beam to a target layer based on position information in vertical wobbles. The method also includes recording an offset voltage for the target layer into the look-up table. Finally, the method includes determining a final voltage based on the look-up table and applying the final voltage to an actuator for moving the laser beam to a final target position in the holographic storage medium for recording and retrieval of information.

In accordance with another embodiment of the invention, a method of retrieving information from a holographic data storage medium is provided. The method includes directing a laser beam to a first micro-holographic symbol located in a first layer of the holographic data storage medium. The micro-holographic symbol contains location information, for example, data layer number, radial and angular locations in a layer or address information for a data section. Finally, the method also includes directing the laser beam to a second micro-holographic symbol of a different angular or radial offset located in the first data layer or a second data layer, wherein the first layer and the second layer are different. Further, the holographic data storage medium comprises a sequence of micro-holographic symbols arranged in multiple layers.

In accordance with another embodiment of the invention, a system for processing information is provided. The system includes one or more pick-up head devices with optical lenses for reading and recording information from a storage medium. The system also includes one or more actuators for moving the one or more pick-up head devices. Further, the system also includes at least one of controller and processor responsive to the data detected by the pick-up head device. The processor is capable of sending a location signal to the one or more actuators for moving the one or more pick-up heads, wherein the one or more pick-up head device directs one or more laser beam to a target track or a target layer. The system includes a memory for storing the information read from the storage medium.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Further, the term 'processing' may refer to reading or recording or rewriting or retrieving of data from a holographic data storage system. Any examples of operating parameters are not exclusive of other parameters of the disclosed embodiments.

Figure 1:
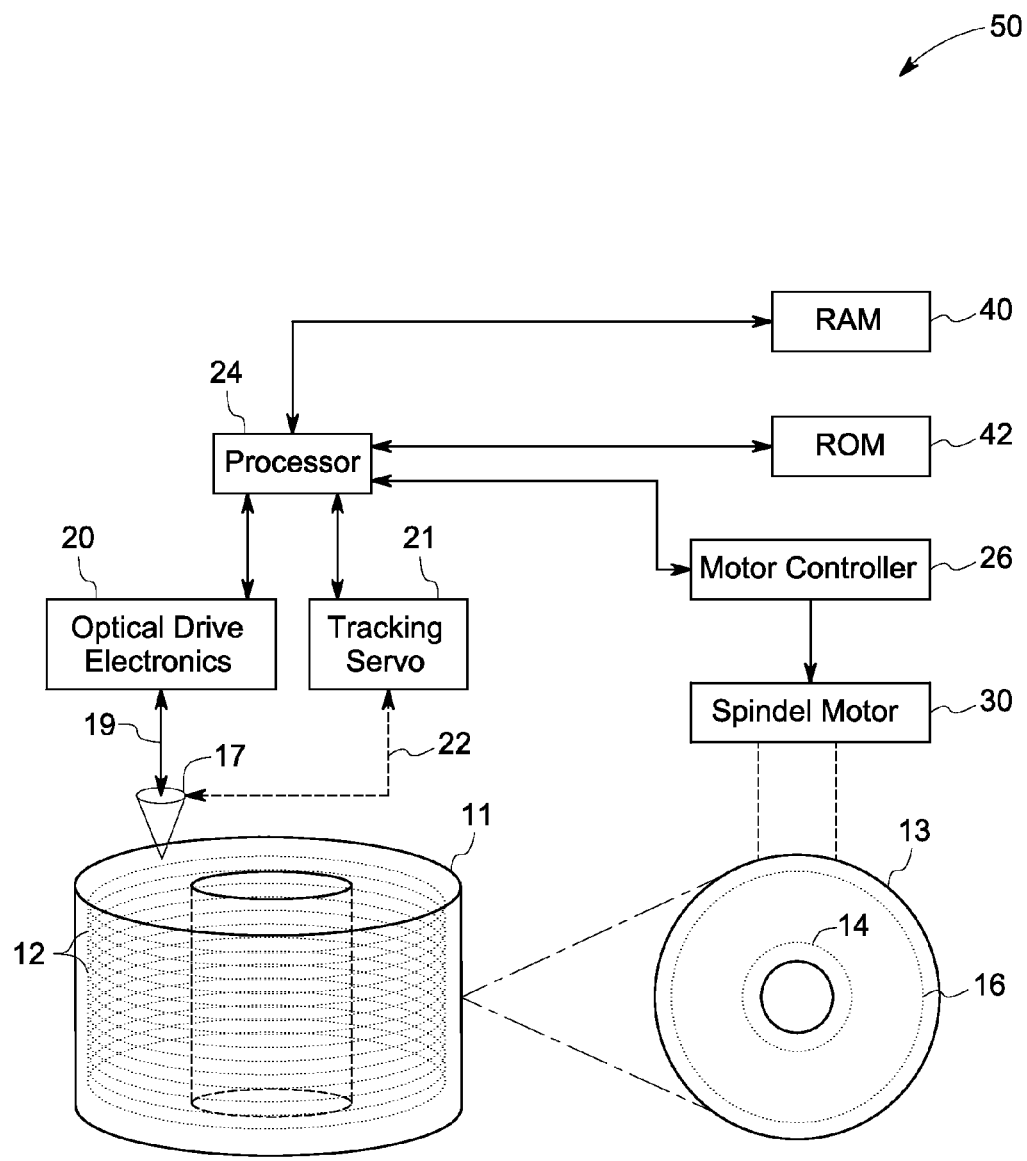
FIG. 1 illustrates a system for processing information of a multilayer optical holographic data storage disk in accordance with an embodiment of the invention.

FIG. 1 illustrates a system 10 for processing information of an optical data storage disk 11 in accordance with an embodiment of the invention. As shown, the volume of the optical data storage disk 11 includes multiple layers 12. The optical data storage disk 11 further includes multiple layers having microholographic symbols arranged in multiple data tracks spiraling around the centre of the optical data storage disk 11. In a non-limiting example, optical data storage disk 11 includes a plastic substrate having multiple volumes arranged along the multiple data tracks in multiple vertically stacked, laterally extending layers; and multiple micro-holograms each contained in a corresponding one of the volumes. The presence or absence of a micro-hologram in each of the volumes is indicative of a corresponding portion of data stored. The multiple data tracks are located in grooves formed between wobbles. As shown, one of the layer 13 of the optical data storage disk 11 includes an inner groove 14 with wobbling in accordance with an embodiment of the invention. The layer 13 also depicts an outer groove 16 with the similar wobbling.

In one embodiment, the system 10 includes one pick-up head device 17 for reading and recording information from the optical data storage disk 11. In another embodiment, the system 10 may include multiple pick-up head devices 17 with optical lenses for processing information at a higher rate. In yet another embodiment, the system 10 includes a series of optical elements (not shown) for projecting a read beam 18 onto the optical data storage disk 11. A reflected beam is picked up from the optical data storage disk 11 by the optical elements.

In one embodiment, the pick up head device 17 may comprise any number of different elements designed to generate excitation beams, focus the beams on the optical data storage disk 11, and detect the reflection beam coming back from the optical data storage disk 11. The pick up head devices 17 are controlled through a coupling 19 to an optical drive electronics package 20. The optical drive electronics package 20 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data storage disk 11.

The location of the pick up head device 17 over the optical data storage disk 11 is controlled by a focus and tracking servo 21 which has a mechanical actuator 22 configured to move the pick up head device 17 in axial and radial directions in relation to the optical data storage disk 11. The optical drive electronics package 20 and the tracking servo 21 are controlled by a processor 24. The processor 24 is responsive to the data detected by the pick-up head 17 and is capable of sending a location signal and coordinating the movement of the one or more pick-up heads 17. In some embodiments in accordance with the present techniques, the processor 24 may be capable of determining the position of the pick up head device 17, based on sampling information that may be received by the pick up head device 17 and fed back to the processor 24. It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the processor may be equipped with a combination of hardware and software for performing the tasks of the invention, as will be understood by those skilled in the art.

Furthermore, the position of the pick up head device 17 may be determined to enhance and/or amplify the reflection or to reduce interferences of the reflection. In some embodiments, the tracking servo 21 or the optical drive electronics 20 may be capable of determining the position of the pick up head device 17 based on sampling information received by the pick up head device 17. The processor 24 also controls a motor controller 26, which provides the power 28 to a spindle motor 30. The spindle motor 30 is coupled to a spindle 32 that controls the rotational speed of the optical data storage disk 11. As the pick up head devices 17 are moved from the outside edge of the optical data storage disk 11 closer to the spindle 32, the processor 24 may increase the rotational speed of the optical data storage disk 11.

Furthermore, the movement of pick up head device 17 is proportional to a voltage applied to the mechanical actuator 22. In one embodiment, the system 10 includes a memory for storing a look-up table having sets of voltage data corresponding to various positions in the optical data storage disk 11. The memory is also capable of storing the information read from the optical data storage disk 11. In one embodiment, the memory is a mass storage random access memory (RAM 40) for storing the multiple data arranged in the look-up table and further provides for storing a reference voltage for allowing the processor 24 to direct a laser beam to a target position. The processor 24 is connected to the RAM 40 and a read only memory or ROM 42. The ROM 42 contains the programs that allow the processor 24 to control the tracking servo 21, optical drive electronics 20, and motor controller 26. Further, the ROM 42 also contains programs that allow the processor 24 to analyze data from the optical drive electronics 20, which has been stored in the RAM 40, among others. It is to be noted that such analysis of the data stored in the RAM 40 may include, for example, demodulation, decoding or other functions necessary to convert the information from the optical data storage disk 11 into a data stream that may be used by other units.

In one embodiment, the system 10 includes a non-limiting example of the look-up table as shown below. The look-up table provides for optimal voltage that is required by the actuators for moving the pick-up heads 17, thereby, causing the pick-up heads to focus a laser beam to a target position in a desired layer.

| Track Number [T] | Voltage for corresponding track number [V] | Layer Number [L] | Voltage for corresponding layer number [V] |
| --- | --- | --- | --- |
| T1 | VT1 | L1 | VL1 |
| T2 | VT2 | L2 | VL2 |
| T3 | VT3 | L3 | VL3 |
| T4 | VT4 | L4 | VL4 |
| T5 | VT5 | L5 | VL5 |

As shown above, the look-up table includes a first set of data (first column) having a sequence of numbers corresponding to the data tracks, a second set of data having voltages (second column) corresponding to multiple data tracks in the layer, a third set of data (third column) having a sequence of numbers corresponding to the multiple layers and a fourth set of data (fourth column) having voltages corresponding to the multiple layers of the storage medium. It is to be noted that each of the column may have more number of data than the number as illustrated in the look-up table and depends on the number of layers and data tracks that can be accommodated in an optical data storage medium. According to one embodiment, in read only holographic disc, the look-up table is formed during recording procedure and saved in ROM 42 (read only memory) of the system 10. In user's reading procedure, the laser beam is directed to a target layer and a target track based on the look up table. According to another embodiment, in read and write disc, the look-up table is formed during recording procedure by the user and saved in a RAM (random access memory) of the system 10 (as shown in FIG. 1). In user's reading procedure, laser beam is directed to target layer and target track based on the look up table.

Figure 2:
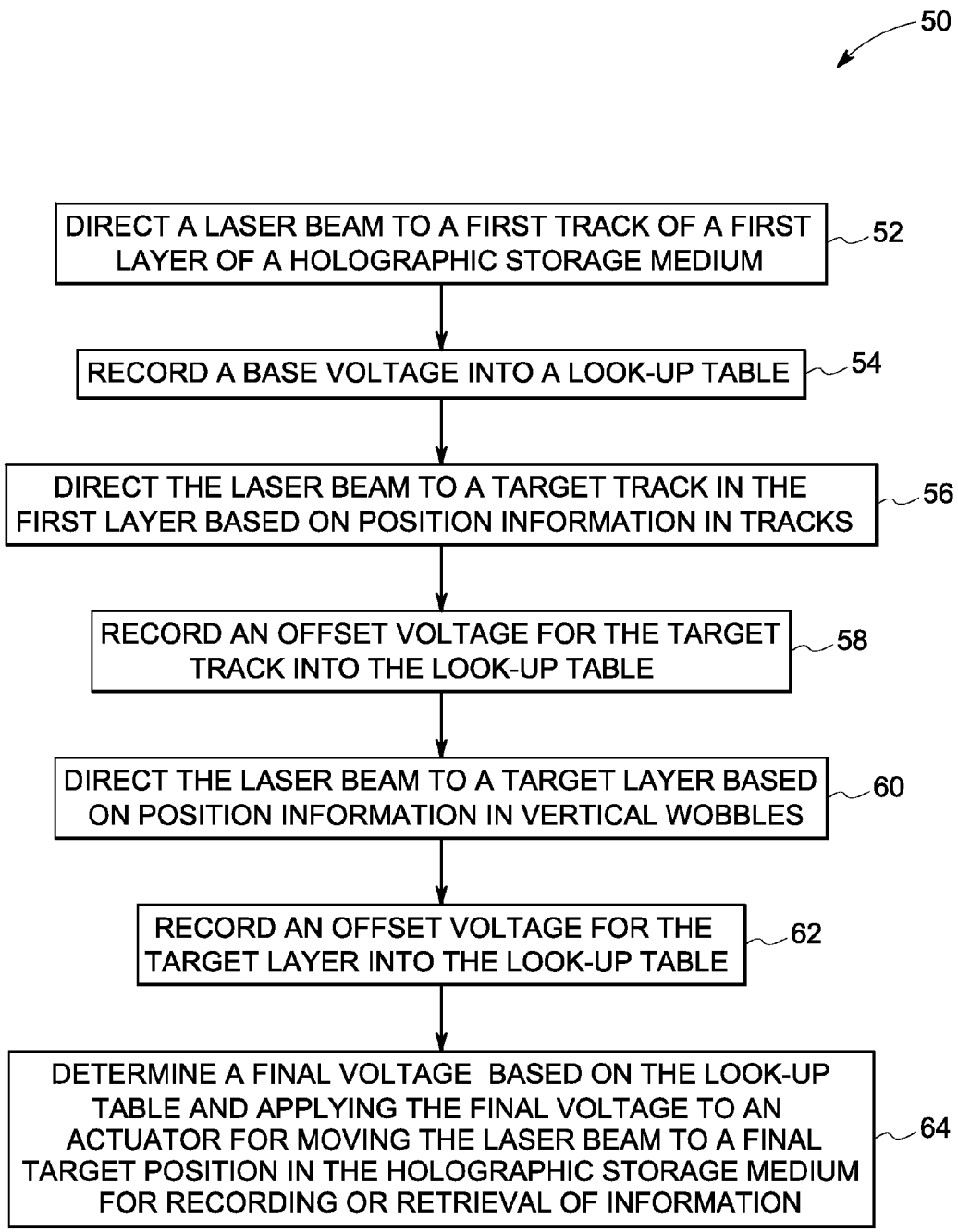
FIG. 2 is a flow chart of an exemplary method of processing information in accordance with an embodiment of the invention.

FIG. 2 illustrates a flow chart of an exemplary method 50 of processing information for read and write holographic disc in accordance with an embodiment of the invention. At step 52, the method 50 includes directing a laser beam to a first track of a first layer of a holographic data storage medium. In one embodiment, directing the laser beam to a target track in the first layer includes moving a pick up head horizontally or vertically. At step 54, the method 50 includes recording a base voltage into the look-up table. At step 56, the method 50 includes directing a laser beam to a target (final) track of the first layer of a holographic data storage medium, based on position information in the tracks. The method also includes recording an offset voltage for the target track into the look-up table in step 58.

Furthermore, at step 60, the method 50 includes directing a laser beam to a target (final) layer based on position information in vertical wobbles. In one embodiment, directing the laser beam to a target layer closer to an outer or inner track of a holographic data storage medium includes moving a pick up head horizontally or vertically. The method also includes recording an offset voltage for a target layer into the look-up table in step 62. The recording of the offset voltage for the target track and the offset voltage for the target layer are both done in the random access memory. Finally at step 64, the method includes determining a final voltage based on the look-up table and includes applying the final voltage to an actuator for moving the laser beam to a final target position in the holographic storage medium for recording or retrieval of information. This movement of the laser beam to a final target position includes focusing an objective lens of the pick-up head to an optimal depth of the target layer.

Figure 3:
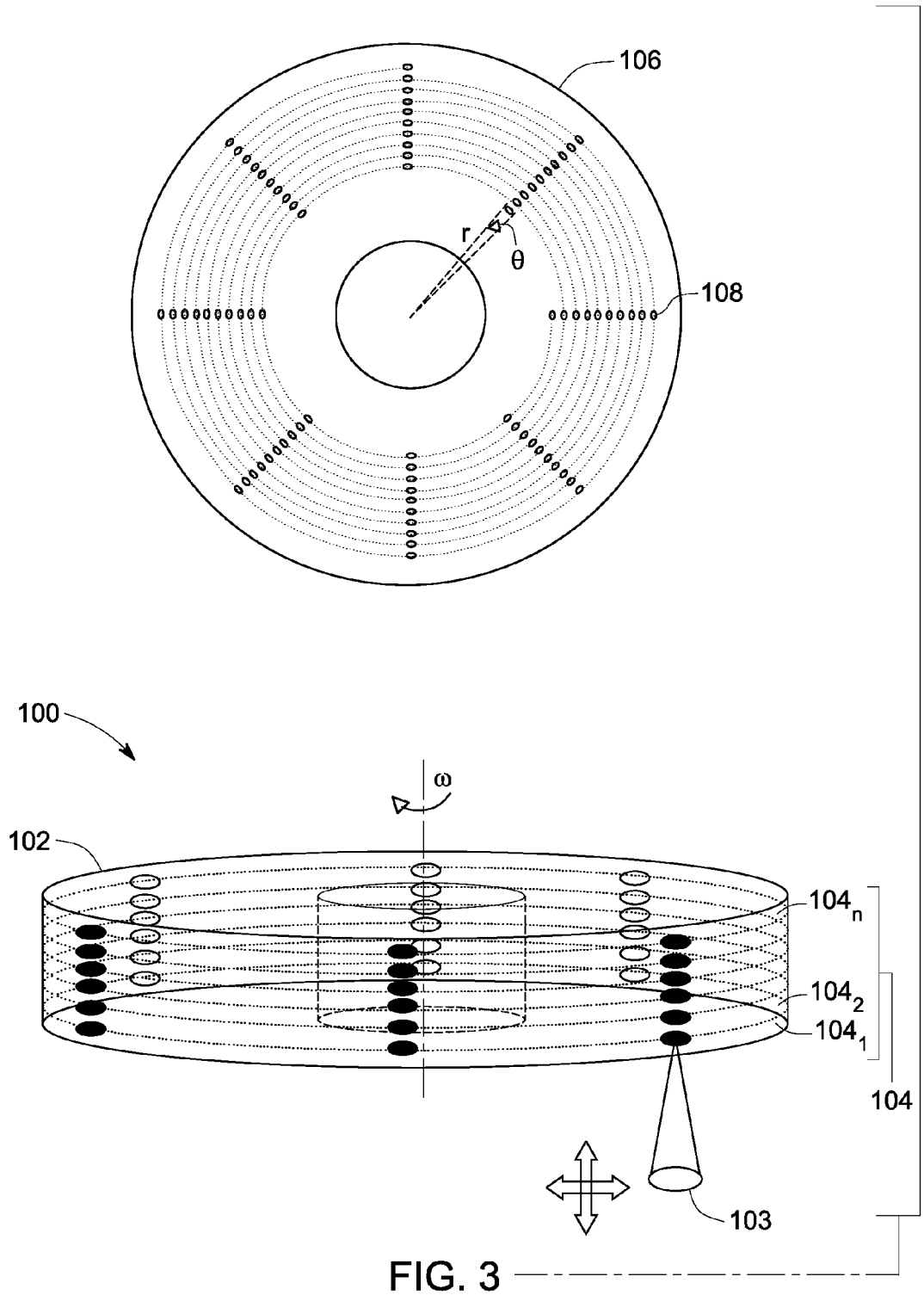
FIG. 3 illustrates a system for processing information of a multilayer optical data storage disk having a sequence of microholographic symbols in accordance with one embodiment of the invention.

FIG. 3 illustrates a system 100 for processing information of a multilayer optical holographic data storage disk 102 in accordance with another embodiment of the invention. In one embodiment, the system 100 includes one optical pick-up head device 103 for reading and recording information from the optical holographic data storage disk 102. In another embodiment, the system 100 includes multiple pick-up head devices 103 with optical lenses for processing information at a higher rate. Further, the volume of the optical data storage disk 102 includes multiple layers 104 shown as $104_1$, $104_2$ and $110_N$. A top view of the holographic data storage disk 102 shows a particular layer 106 having one or more microholographic symbols 108, which microholographic symbols 108 comprises layer, radial and angular location information or address information of a data section, written at an arc of length $r\theta$ on a spiral data track, wherein 'r' is the radial distance of the microholographic symbol 108 from the centre of the optical holographic data storage disk 102 and '$\theta$' is the angle formed by the arc in the holographic data storage disk 102. In one embodiment, one or more sets of such holographic symbols 108 can be arranged in different radial locations in one or more layers 104. In another embodiment, one or more sets of microholographic symbols 108 can be arranged in different angular locations on one or more data layers 104 in the holographic data storage disk 102. The holographic symbols 108 are arranged in different radial or angular locations on the data layers 104 such that when the optical pickup head 103 changes focus from one data layer to another data layer or between tracks in same layer during disk rotation, a first address symbol encountered by the optical pickup head device 103, provides for an accurate layer, radial and angular location information for data seeking.

Figure 4:
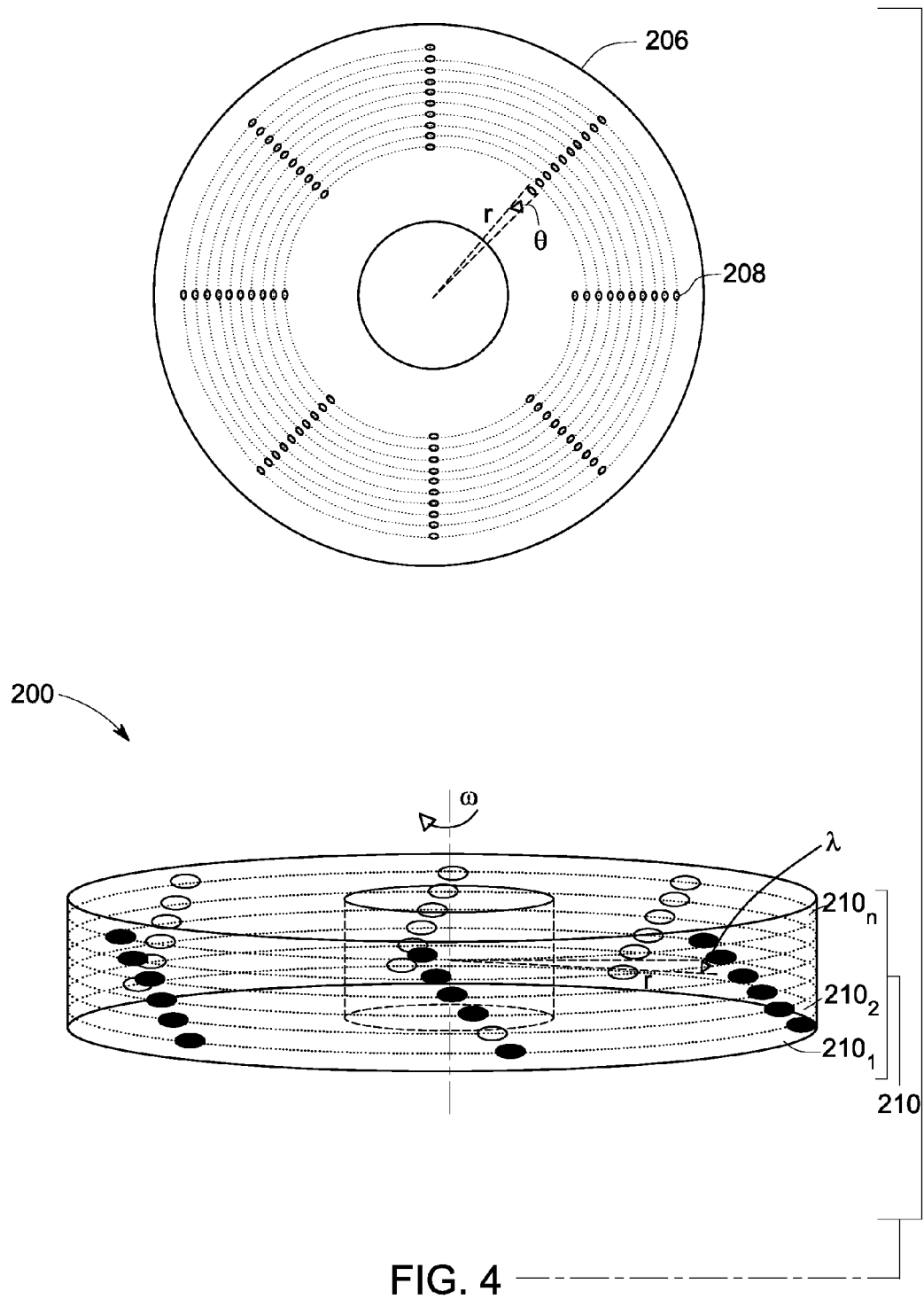
FIG. 4 illustrates a multilayer optical data storage disk having a sequence of microholographic symbols in accordance with another embodiment of the invention.

FIG. 4 shows another embodiment of a multilayer optical holographic data storage disk 200. A top view of the holographic data storage disk 200 shows a particular layer 206 having one or more microholographic symbols 208, which microholographic symbols 208 comprises layer, radial and angular location information or address information of a data section, written at an arc of length $r\theta$ on a spiral data track, wherein 'r' is the radial distance of the microholographic symbol 208 from the centre of the optical data storage disk 200 and '$\theta$' is the angle formed by the arc in the disk 200. The microholographic symbol 208 contains location information, for example, data layer number, radial and angular locations in a layer or address information for a data section. Corresponding microholographic symbols of the multiple layers 210 are written at the multiple data layers $210_1$, $210_2$, $210_N$ with an angular offset angle '$\lambda$' from the adjacent layer for compensating the relative rotational displacement of the holographic data storage disk 200 when an optical pickup head is changing focus from one data layer to another data layer. This staircase-like arrangement minimizes the seek time while the optical pick-up head is focusing through different data layers.

Figure 5:
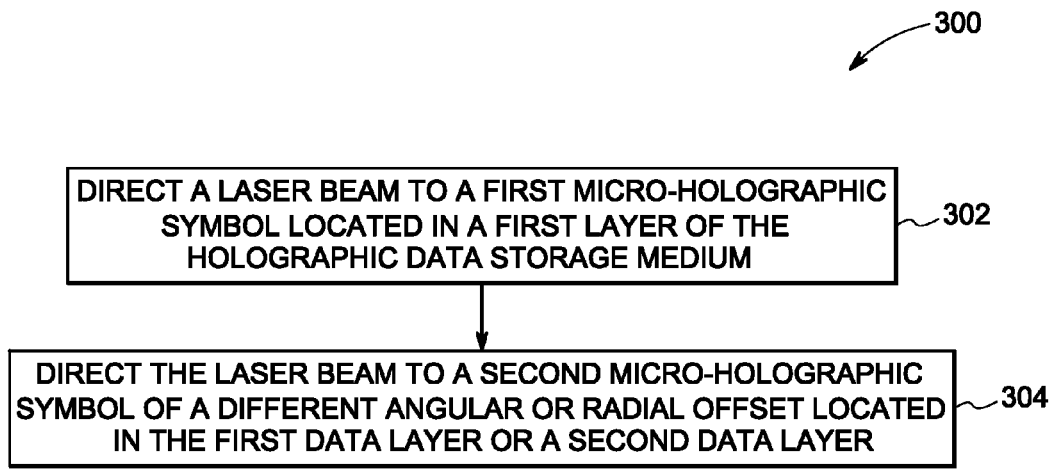
FIG. 5 is a flow chart of an exemplary method of retrieving information from a holographic data storage medium in accordance with an embodiment of the invention.

FIG. 5 is a flow chart of an exemplary method 300 of retrieving information from a holographic data storage medium in accordance with an embodiment of the invention. At step 302, the method includes directing a laser beam to a first micro-holographic symbol located in a first layer of the holographic data storage medium. The micro-holographic symbol contains location information, for example, data layer number, radial and angular locations in a layer or address information for a data section. As discussed above with respect to FIG. 3, the holographic data storage medium may include the first micro-holographic symbol written at an arc length $r\theta$, wherein 'r' is the radial distance of the microholographic symbol from the centre of the optical data storage disk and $\theta$ is the angle formed by the arc to the centre of the disk. Finally, at step 304, the method includes directing the laser beam to a second micro-holographic symbol of a different angular or radial offset located in the first layer or a second layer. Thus, the method 300 provides for reading of microholographic data from one layer to another layer above or below. The method 300 further provides for minimizing both the seek time of the pick-up head movement and the processing time for information retrieval.

Figure 6:
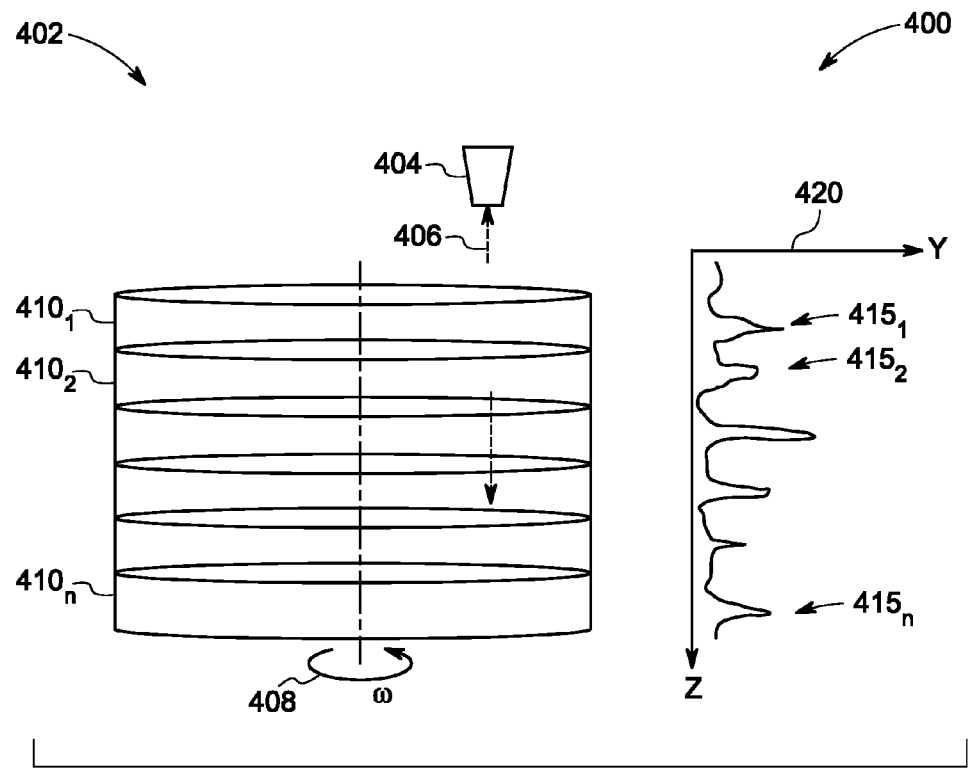
FIG. 6 illustrates a system for focusing the laser beam through multiple layers of an optical data storage disk in accordance with an embodiment of the invention.

FIG. 6 illustrates a system 400 for processing information from an optical data storage disk 402 in accordance with an embodiment of the invention. The system 400 includes a pick up head device 404 with optical lenses for focusing a laser beam 406 through the optical data storage disk 402 having 'N' multiple layers $410_1$, $410_2$ to $410_N$. The optical data storage disk 402 spins about an axis 408 with an optimal speed $\omega$ in the system 400 during the processing of information. Each of the layer 101, 4102 to 410N includes multiple microholographic symbols.

As shown, the pick-up head device 404 is capable of transmitting the laser beam 406 through the multiple layers $410_1$ to $410_N$ and receiving the returned laser beam. In one embodiment, the system 400 employs a processor for analyzing intensity of the returned laser beam and a suitable display system for displaying results of the analysis in the form of a chart or a plot 420. As illustrated, the plot 420 depicts a z-axis signifying depth of the optical data storage disk 402. A local maximum in the plot 420 signifies a layer of the optical data storage disk 402. Thus, the series of 'N' maxima for 'N' multiple layers is represented by $415_1$, $415_2$ to $415_N$ in the plot. Further, the system 400 includes an algorithm stored in a memory that enables to focus the laser beam to a target layer for reading and recording of information in the optical data storage disk 402. The stored algorithm efficiently allows focusing the laser beam through multiple layers of the optical data storage disk 402 as shown in a flow chart in FIG. 7.

Figure 7:
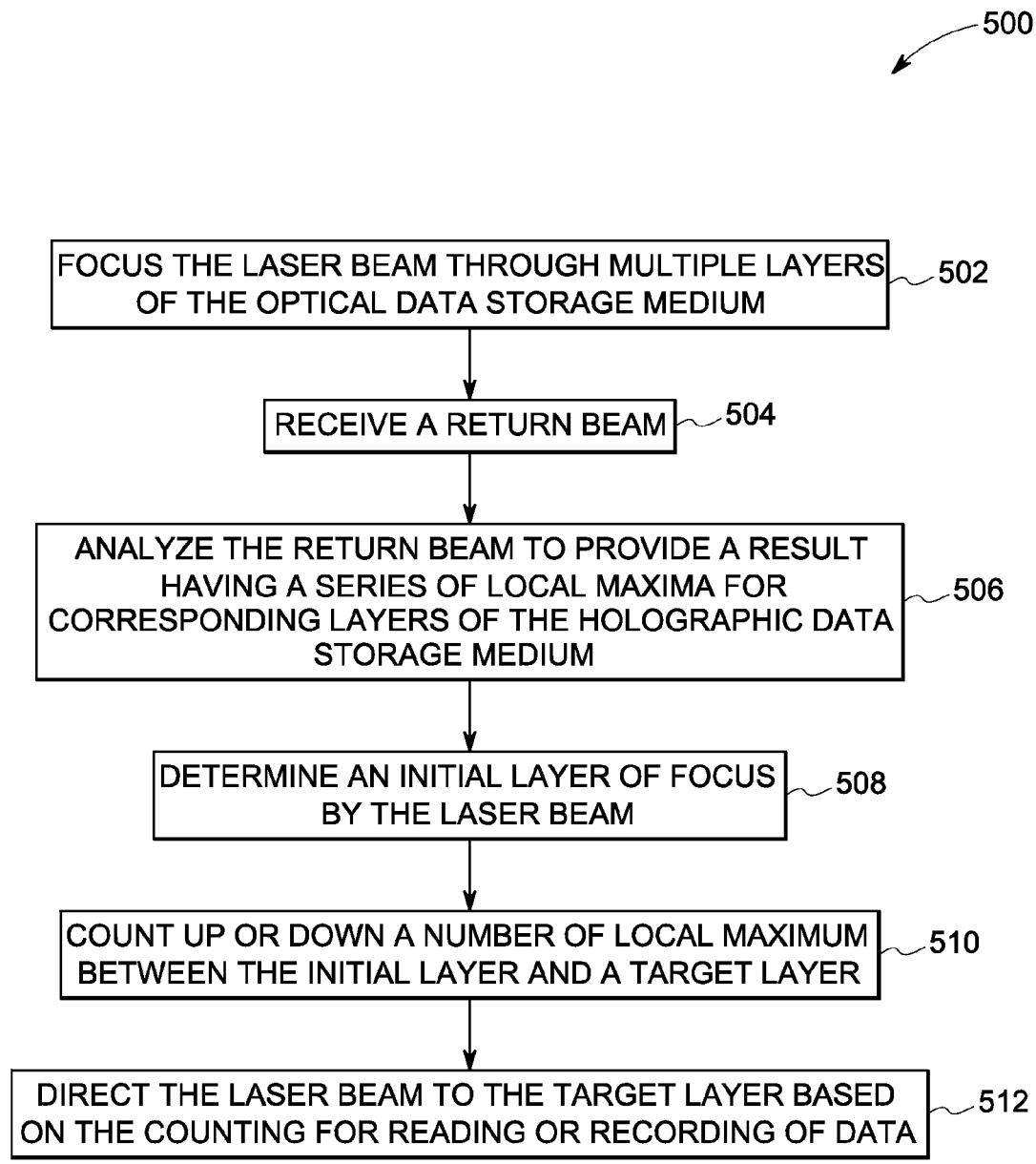
FIG. 7 is a flow chart of an exemplary method of focusing the laser beam through multiple layers of an optical data storage disk in accordance with an embodiment of the invention.

As discussed, FIG. 7 is a flow chart of an exemplary method 500 of focusing a laser beam through multiple layers of an optical data storage medium in accordance with an embodiment of the invention. At step 502, the method includes focusing the laser beam through the multiple layers of the optical data storage medium. At step 504, the method includes receiving a return beam. Further at step 506, the method includes analyzing the return beam to provide a result having a series of local maxima for corresponding layers of the optical data storage medium (as shown in FIG. 6). At step 508, the method includes determining an initial layer of focus by the laser beam. At step 510, the method includes counting up or down a number of local maximum between the initial layer and a target layer. The local maxima represent optical intensity peaks equal to the number of layers between the initial layer of focus to the new target layer. Finally, the method includes directing the laser beam to the target layer based on the counting for reading or recording of data in step 512.

Advantageously, the present method and system enables the processing of information from a holographic data storage medium easily and rapidly using a look-up table stored in a memory. The present invention enables the retrieval of information rapidly by minimizing the seek time of the movement of the pick-up heads while jumping from one track to another track in a different layer. The present invention also ensures that the pick-up head is accurately focused to read symbol holograms from the correct disc layer in the data storage medium.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of retrieving information from a holographic data storage medium, comprising:
    directing a laser beam to a first micro-holographic symbol located in a first layer of the holographic data storage medium; and
    directing the laser beam to a second micro-holographic symbol located in the first layer or a second layer, wherein the first layer and the second layer are different, wherein the holographic data storage medium comprises a sequence of micro-holographic symbols arranged in one or more locations in one or more data layers, wherein the micro-holographic symbol comprise location information, such as layer number, radial and/or angular location information in the holographic storage medium and/or address information for a data section, wherein the sequence of micro-holographic symbols arranged in a plurality of layers form a staircase structure wherein each micro-holographic symbol is offset angularly from corresponding symbol in adjacent layers in the holographic data storage medium.

2. The method of claim 1, wherein the method allows servo signals to adapt according to the offset distance, wherein the optimal offset distance is variable.

3. The method of claim 1, further comprising retrieving information from a plurality of micro-holographic symbols arranged in a plurality of staircase structures in the holographic data storage medium.

4. The method of claim 1, further comprising:
    focusing the laser beam through the plurality of layers of the holographic data storage medium;
    receiving a return beam; and
    analyzing the return beam to provide a result having a series of local maxima for corresponding layers of the holographic data storage medium.

5. The method of claim 4, further comprising:
    determining an initial layer of focus by the laser beam;
    counting up or down a number of local maximum between the initial layer and a target layer;
    directing the laser beam to the target layer based on the counting for reading or recording of data.

6. A system for processing information, comprising:
    one or more pick-up head devices with optical lenses for reading and recording information from a storage medium, wherein the storage medium comprises a sequence of micro-holographic symbols arranged in a plurality of layers forming a staircase structure with each micro-holographic symbol disposed at an optimal offset distance radially in the storage medium;
    one or more actuators for moving the one or more pick-up head devices;
    at least one of controller and processor responsive to the data detected by the pick-up head, said processor capable of sending a location signal to the one or more actuators for moving the one or more pick-up head devices;
        wherein the one or more pick-up head devices direct one or more laser beam to a target track or a target layer; and
    a memory for storing the information read from the storage medium, wherein the memory is a mass storage random access memory (RAM) for storing a plurality of data arranged in a look-up table during reading and recording information in the storage medium and further storing a reference voltage in the look-up table for allowing the controller to direct a laser beam to a target position.

7. The system of claim 6, wherein the look-up table further comprises:
- a first set of data having a sequence of numbers corresponding to the data tracks;
- a second set of data having voltages corresponding to the plurality of data tracks in the layer;
- a third set of data having a sequence of numbers corresponding to the plurality of layers; and
- a fourth set of data having voltages corresponding to the plurality of layers of the storage medium.

8. The system of claim 6, wherein the storage medium comprises a plurality of layers disposed therein, each layer comprising a track, the track containing a volume arranged thereon, the volume containing a plurality of micro-holograms, each of said plurality of micro-holograms comprising data.

* * * * *